(12) United States Patent
Young

(10) Patent No.: US 6,457,661 B1
(45) Date of Patent: Oct. 1, 2002

(54) FISHING REEL WITH FASTER SPOOL OSCILLATION

(75) Inventor: John N. Young, Fairfax, CA (US)

(73) Assignee: PACP, Inc., Novato, CA (US)

( * ) Notice: Subject to any disclaimer, the term of this patent is extended or adjusted under 35 U.S.C. 154(b) by 0 days.

(21) Appl. No.: 09/772,691

(22) Filed: Jan. 30, 2001

Related U.S. Application Data

(60) Provisional application No. 60/211,765, filed on Jun. 14, 2000.

(51) Int. Cl.[7] .............................................. A01K 89/01
(52) U.S. Cl. ....................................... 242/241; 242/278
(58) Field of Search ................................ 242/241, 242, 242/243, 278, 279

(56) References Cited

U.S. PATENT DOCUMENTS

| | | | |
|---|---|---|---|
| 4,773,611 A | | 9/1988 | Kaneko |
| 4,865,262 A | * | 9/1989 | Tsunoda ...................... 242/241 |
| 5,279,477 A | | 1/1994 | Yoshikawa |
| 5,427,324 A | * | 6/1995 | Kawashiro .................. 242/242 |
| 5,564,639 A | * | 10/1996 | Yamaguchi .................. 242/241 |
| 5,662,285 A | | 9/1997 | Hashimoto |
| 5,775,312 A | * | 7/1998 | Hashimoto .................. 242/241 |
| 5,890,668 A | | 4/1999 | Hitomi |
| 5,931,398 A | * | 8/1999 | Oh ............................ 242/241 |
| 5,941,470 A | | 8/1999 | Young |
| 6,073,870 A | * | 6/2000 | Shinohara et al. .......... 242/241 |
| 6,290,157 B1 | * | 9/2001 | Shibata ........................ 242/241 |

* cited by examiner

Primary Examiner—Emmanuel M. Marcelo
(74) Attorney, Agent, or Firm—Jack Lo

(57) ABSTRACT

The present fishing reel is comprised of a reel body for attaching to a fishing pole. A main shaft is positioned in the body and project out the front of the body. A spool is positioned around the front or outer end of the main shaft. A rotor is positioned around the main shaft behind the spool and is rotatable about the shaft. A pinion gear is positioned within the body around the inner end of the main shaft and is rotatable independently about the shaft. The pinion gear is fixedly connected to the rotor through a sleeve around the main shaft for simultaneous rotation. A drive gear is positioned outside the body behind the rotor and coaxial with the sleeve. The drive gear is also rotationally fixed relative to the rotor and sleeve. A lead screw is positioned in the body parallel to the main shaft. A lead screw gear is fixedly attached to a forward end of the lead screw. The lead screw gear is engaged with and driven by the drive gear. An oscillation block has a first end slidably connected to the lead screw, and a second end fixedly attached to the inner end of the main shaft. The pinion gear is driven by a main gear which is driven by a crank handle. The drive gear is preferably larger than the pinion gear for driving the lead screw at higher speed for faster spool oscillation to produce a larger crosswind angle in the fishing line.

12 Claims, 2 Drawing Sheets

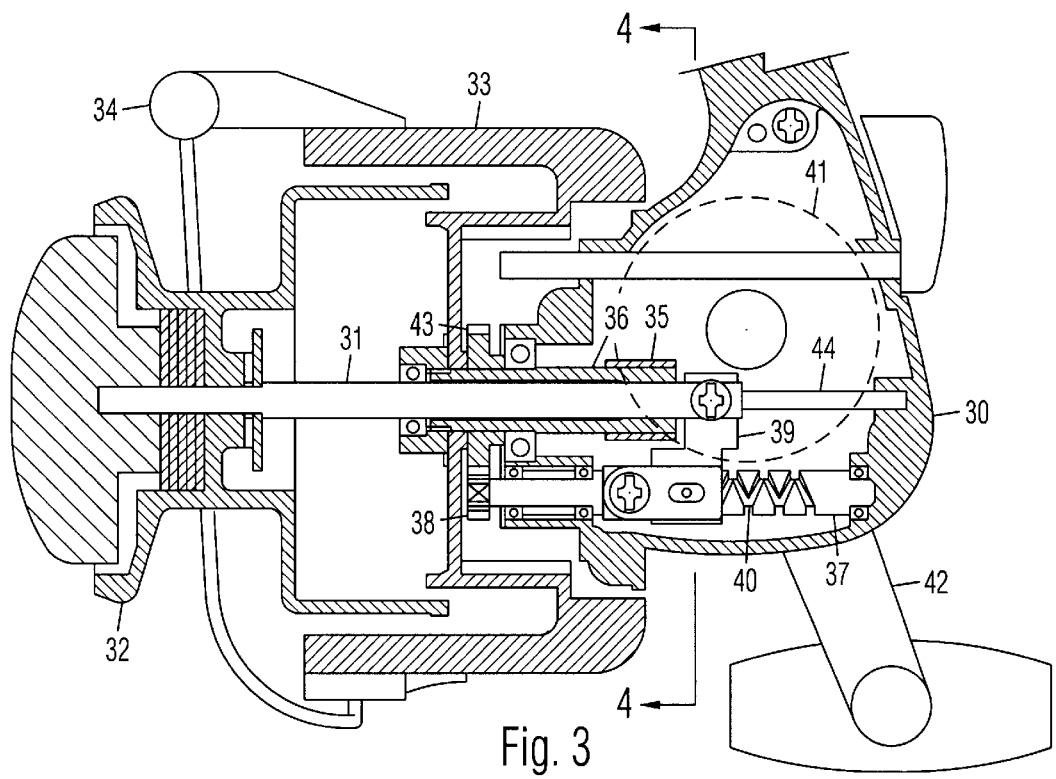
Fig. 3
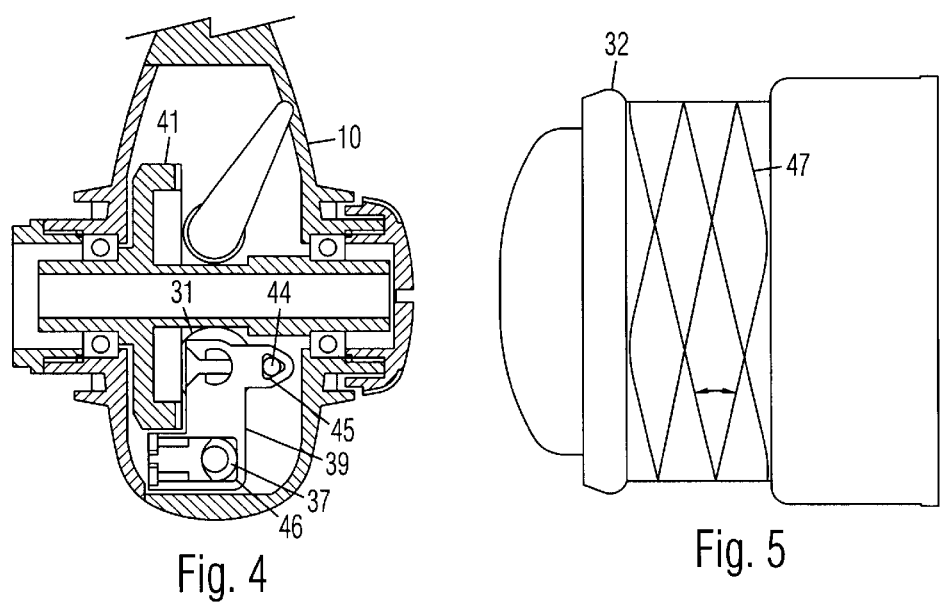
Fig. 4
Fig. 5

FISHING REEL WITH FASTER SPOOL OSCILLATION

CROSS REFERENCE TO RELATED APPLICATIONS

I claim the priority of provisional patent application No. 60/211,765, filed Jun. 14, 2000.

BACKGROUND OF THE INVENTION

1. Field of the Invention

This invention relates generally to fishing reels.

2. Prior Art

A typical prior art fishing reel shown in FIG. 1 is comprised of a reel body 10 for attaching to a fishing pole. A main shaft 11 is positioned in body 10 and projects out the front of the body. A spool 12 is positioned around the front or outer end of main shaft 11. A rotor 13 is positioned around main shaft 11 behind spool 12 and is rotatable about the shaft. A roller 14 is attached to the front of rotor 13. A pinion gear 15 is positioned within body 10 around the inner end of main shaft 11 and is rotatable independently about the shaft. Pinion gear 15 has a sleeve 16, and is fixedly connected to rotor 13 through sleeve 16 around main shaft 11 for simultaneous rotation. A lead screw 17 is positioned in body 10 parallel to main shaft 11. A lead screw gear 18 is fixedly attached to a forward end of lead screw 17. Lead screw gear 18 is engaged with and driven by pinion gear 15. An oscillation block 19 has a first end slidably connected to lead screw 17, and a second end fixedly attached to the inner end of main shaft 11. Grooves 20 are provided on lead screw 17 for driving oscillation block 19 through conventional connections which are not shown. Pinion gear 15 is driven by a main gear 21 which is driven by a crank handle 22 through conventional connections which are not shown.

When handle 22 is turned, pinion gear 15 is driven by main gear 21. Rotor 13 is simultaneously driven through its connection with pinion gear 15 to rotate about main shaft 11. A fishing line (not shown) threaded around roller 14 is wound around spool 12 by rotating rotor 13. As handle 22 is turned, lead screw gear 18 is also rotated by engagement with pinion gear 15. Lead screw 17 is rotated by lead screw gear 18, and oscillation block 19 is repeatedly driven back and forth or oscillated along lead screw 17. Main shaft 11 and spool 12 are also driven back and forth relative to rotor 13 by being connected to oscillation block 17. As a result, the fishing line is spread out along the length of spool 12 for smoothly and evenly filling the spool. As fishing line 23 is wound back and forth along the length of the spool, a crisscrossing winding pattern shown in FIG. 2 is produced.

The crosswind angle between succeeding layers of line is determined by the speed of the spool's back and forth oscillation relative to the speed of the rotor's rotation. The spool oscillation speed is determined by the pitch of grooves 20 on lead screw 17 and the gear ratio between pinion gear 15 and lead screw gear 18. In a typical prior art fishing reel, the spool oscillation speed is limited because the pitch of grooves 20 is already at a practical maximum, and pinion gear 15 is relatively small. The size of pinion gear 15 is dictated by the desired rotation speed of rotor 13, and is also limited by the tight space within body 10. Since lead screw gear 18 is driven directly by relatively small pinion gear 15, the oscillation speed of spool 12 is limited to winding fishing line 23 at the fine or small crosswind angle shown in FIG. 2. A fine crosswind angle is undesirable because succeeding layers of fishing line are almost parallel to each other, and the outer layers tend to dig into the lower layers. When the line is cast or released, it will tend to snag and reduce the casting distance, or even come out bunched together and become tangled.

Another disadvantage of prior art fishing reels is that since lead screw gear 18 is driven directly by pinion gear 15, lead screw 17 must be almost entirely positioned behind pinion gear 15. This results in a relatively long reel body 10 which many fisherman find undesirable.

OBJECTIVES OF THE INVENTION

The objectives of the present fishing reel are:

to speed up the spool oscillation to increase the crosswind angle of the fishing line on the spool for smoother casting;

to reduce the length of the reel body for compactness and reduced weight;

to reduce friction in the oscillator for improved performance; and to be more economical to manufacture.

Further objectives of the present invention will become apparent from a consideration of the drawings and ensuing description.

BRIEF SUMMARY OF THE INVENTION

The present fishing reel is comprised of a reel body for attaching to a fishing pole. A main shaft is positioned in the body and project out the front of the body. A spool is positioned around the front or outer end of the main shaft. A rotor is positioned around the main shaft behind the spool and is rotatable about the shaft. A pinion gear is positioned within the body around the inner end of the main shaft and is rotatable independently about the shaft. The pinion gear is fixedly connected to the rotor through a sleeve around the main shaft for simultaneous rotation. A drive gear is positioned outside the body behind the rotor and coaxial with the sleeve. The drive gear is also rotationally fixed relative to the rotor and sleeve. A lead screw is positioned in the body parallel to the main shaft. A lead screw gear is fixedly attached to a forward end of the lead screw. The lead screw gear is engaged with and driven by the drive gear. An oscillation block has a first end slidably connected to the lead screw, and a second end fixedly attached to the inner end of the main shaft. The pinion gear is driven by a main gear which is driven by a crank handle. The drive gear is preferably larger than the pinion gear for driving the lead screw at higher speed for faster spool oscillation to produce a larger crosswind angle in the fishing line.

BRIEF DESCRIPTION OF THE SEVERAL VIEWS OF THE DRAWING

FIG. 3 is a side sectional view of the present fishing reel.

FIG. 4 is an end sectional view of the present fishing reel, taken along line 4—4 in FIG. 3.

FIG. 5 is a side view of a spool of the present fishing reel showing a large crosswind angle in a fishing line wound around the spool.

DRAWING REFERENCE NUMERALS

Figure 1:
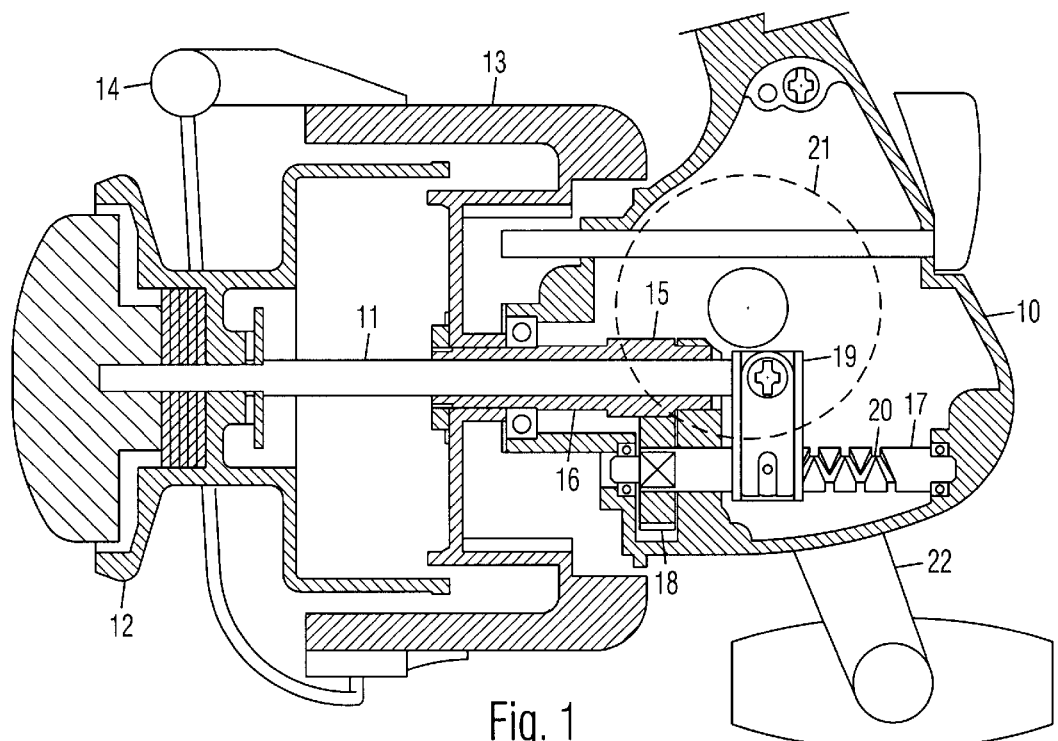
FIG. 1 is a side sectional view of a prior art fishing reel.
Figure 2:
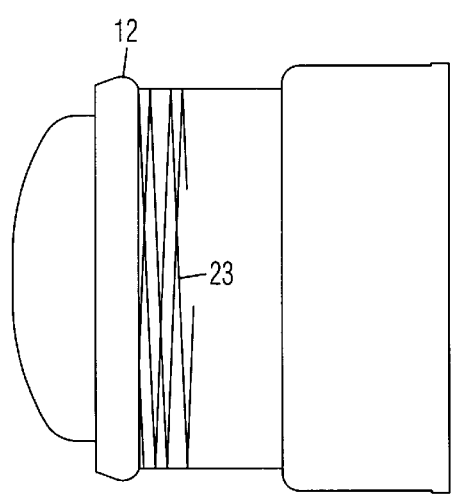
FIG. 2 is a side view of a spool of the fishing reel of FIG. 1 showing a small crosswind angle in a fishing line wound around the spool.

10. Reel Body
11. Main Shaft

12. Spool
13. Rotor
14. Roller
15. Pinion Gear
16. Sleeve
17. Lead Screw
18. Lead Screw Gear
19. Oscillation Block
20. Grooves
21. Main Gear
22. Crank Handle
23. Fishing Line
30. Reel Body
31. Main Shaft
32. Spool
33. Rotor
34. Roller
35. Pinion Gear
36. Sleeve
37. Lead Screw
38. Lead Screw Gear
39. Oscillation Block
40. Grooves
41. Main Gear
42. Crank Handle
43. Drive Gear
44. Pin
45. Polygonal Hole
46. Polygonal Hole
47. Fishing Line

DETAILED DESCRIPTION OF THE INVENTION

A preferred embodiment of the present fishing reel is shown in a side sectional view in FIG. 3. It is comprised of a reel body 30 for attaching to a fishing pole. A main shaft 31 is positioned in body 30 and projects out the front of the body. A spool 32 is positioned around the front or outer end of main shaft 31. A rotor 33 is positioned around main shaft 31 behind spool 32 and is rotatable about the shaft. A roller 34 is attached to the front of rotor 33. A pinion gear 35 is positioned within body 30 around main shaft 31 and is independently rotatable about the shaft. Pinion gear 35 has a sleeve portion 36 positioned around main shaft 31. Pinion gear 35 is fixedly connected to rotor 33 through sleeve 36 for simultaneous rotation. Sleeve 36 is supported at the front of body 10 by bearings attached to the body. A lead screw 37 is positioned in body 30 parallel to main shaft 31. The opposite ends of lead screw 37 are supported by bearings attached to body 30. A lead screw gear 38 is fixedly attached adjacent a forward end of lead screw 37 and is positioned outside the front end of body 10. Lead screw gear 38 is engaged with and driven by a drive gear 43 which is positioned around sleeve 36 between body 30 and rotor 33. Drive gear 43 is fixedly attached to rotor 33 and sleeve 36 for simultaneous rotation, but it may be attached directly to sleeve 36 and connected indirectly to rotor 33 through sleeve 36, and vice versa. Therefore, the connection between drive gear 43 and either sleeve 36 or rotor 33 can be direct or indirect, as long as drive gear 43 is arranged to rotate simultaneously with sleeve 36 and rotor 33. An oscillation block 39 has a first end slidably connected to lead screw 37, and a second end fixedly attached adjacent the rear or inner end of main shaft 31. Grooves 40 are provided on lead screw 37 for driving oscillation block 39 through conventional connections. Pinion gear 35 is driven by a main gear 41 which is driven by a crank handle 42 through conventional connections which are not shown.

The inner end of main shaft 31 is supported by oscillation block 39, which is supported by lead screw 37. Oscillation block 39 is also supported by a pin 44 attached to body 10. Although pin 44 appears to be coaxial with and connected to main shaft 31 in FIG. 3, it is actually behind main shaft 31 in FIG. 3. Pin 44 is clearly separate from main shaft 31 in FIG. 4. Pin 44 is positioned through a first polygonal hole 45 in oscillation block 39 for reduced friction, as shown in FIG. 4. Lead screw 37 is positioned through a second polygonal hole 46 in oscillation block 39, also for reduced friction. Hole 45 is preferably triangular, and hole 46 is preferably rectangular. The inner end of main shaft 31 is thus stabilized by lead screw 37 and pin 44.

When handle 42 is turned, pinion gear 35 is driven by main gear 41. Main gear 41 is also shown in FIG. 4. Referring back to FIG. 3, rotor 33 is simultaneously driven through its connection with pinion gear 35 to rotate about main shaft 31. A fishing line (not shown) threaded around roller 34 is wound around spool 32 by rotating rotor 33. Lead screw gear 38 is also rotated by being engaged with drive gear 43, which is fixed to rotate with pinion gear 35 and rotor 33. Lead screw 37 is rotated by lead screw gear 38, and oscillation block 39 is repeatedly driven back and forth along lead screw 37. Main shaft 31 and spool 32 are driven back and forth relative to rotor 33 by being connected to oscillation block 37. As a result, the fishing line is spread out along the length of spool 32 for smooth and even filling of the spool. As the line is wound back and forth along the length of the spool, a crisscrossing winding pattern shown in FIG. 5 is produced.

A critical novelty in the present fishing reel is that an additional gear, that is, drive gear 43, is provided to drive lead screw gear 38. Since drive gear 43 is separate from pinion gear 35, which is used by prior art fishing reels to drive lead screw gear 38, drive gear 43 may be substantially larger than pinion gear 35 for driving lead screw 37 at a higher speed. The speed ratio can be at least about 1.15:1 or even higher. The oscillation speed of spool 32 is increased by the faster rotation of lead screw 37, and the crosswind angle between adjacent layers of fishing lines on spool 32 is increased to that shown in FIG. 5. The larger crosswind angle prevents succeeding layers of fishing line from digging into the lower layers, and ensures that the line is smoothly unwound or cast from spool 32 without snagging.

Another critical novelty is that drive gear 43 and lead screw gear 38 are both external of reel body 10. Outside the confined space within body 10, drive gear 43 can be made larger for oscillating spool 32 at a higher speed. Also, the outside positioning of drive gear 43 and lead screw gear 38 enables them to be more easily assembled during the manufacturing process for lower cost. Also, the oscillation speed of spool 32 can be changed by simply changing the relative sizes of drive gear 43 and lead screw gear 38.

Since drive gear 43 is positioned outside of body 10 and substantially forward of pinion gear 35, lead screw 37 is positioned much more forward than prior art lead screws. Specifically, the rearmost portion of grooves 40 is substantially forward of the rearmost edge of main gear 41. Also, a first end of oscillation block 39 which is slidably connected to lead screw 37 is offset forwardly relative to a second end which is connected to main shaft 31. The forward position of the first end of oscillation block 39 further enables lead screw 37 to be moved as far forward as possible. As a result, reel body 10 is much shorter than prior art reel bodies for more compactness, lighter weight, and reduced manufacturing cost.

Although the above description is specific, it should not be considered as a limitation on the scope of the invention, but only as an example of the preferred embodiment. Many variations are possible within the teachings of the invention. For example, different attachment methods, fasteners, materials, dimensions, etc. can be used unless specifically indicated otherwise. The relative positions of the elements can vary, and the shapes of the elements can vary. Therefore, the scope of the invention should be determined by the appended claims and their legal equivalents, not by the examples given.

I claim:

1. A fishing reel, comprising:

a reel body for attaching to a fishing pole, wherein said reel body has a front end and a rear end;

a main shaft positioned in said reel body and projecting out said front end of said reel body;

a spool positioned around said main shaft forward of said reel body;

a sleeve positioned within said reel body around said main shaft, wherein said sleeve is independently rotatable around said main shaft;

a rotor positioned around said main shaft forward of said reel body and fixedly connected to said sleeve for being driven by said sleeve;

a pinion gear positioned within said reel body fixedly around a rear end of said sleeve and thus fixedly connected to said rotor by said sleeve;

a lead screw positioned within said reel body parallel to said main shaft;

a lead screw gear fixedly attached around a forward end of said lead screw;

a drive gear coaxial with said sleeve and positioned forward of said pinion gear, wherein said drive gear is arranged to rotate simultaneously with said sleeve and said rotor, and said lead screw gear is engaged with and driven by said drive gear;

an oscillation block with a first end slidably connected to said lead screw, and a second end fixedly attached to said rear end of said main shaft; and a support pin fixedly attached to said reel body and slidably extending through said oscillation block in parallel to said main shaft, wherein said pin positioned through a polygonal hole in said oscillation block for reducing friction;

wherein when said pinion gear is rotated, said rotor is driven to rotate about said main shaft and is adapted to wind a fishing line around said spool, said drive gear is rotated simultaneously with said pinion gear, said lead screw gear is rotated by said drive gear, said lead screw is rotated by said lead screw gear, said oscillation block is repeatedly driven back and forth along said lead screw, said main shaft and said spool are driven back and forth relative to said rotor by being connected to said oscillation block, said spool is thus adapted to spread out said fishing line along a length of said spool for smooth and even filling of said spool in a criss-crossing winding pattern.

2. The fishing reel of claim 1, wherein said drive gear is larger than said pinion gear for driving said lead screw at greater speed, thereby increasing an oscillation speed of said spool for increasing a crosswind angle between adjacent layers of said fishing line on said spool, wherein the increased crosswind angle prevents succeeding layers of said fishing line from digging into lower layers for smoother casting.

3. The fishing reel of claim 1, wherein said first end of said oscillation block which is slidably connected to said lead screw is offset forwardly relative to said second end which is connected to said main shaft, wherein the forward positioning of said first end of said oscillation block enables said lead screw to be more forward and said reel body to be shorter for compactness.

4. The fishing reel of claim 1, wherein said lead screw is positioned through a polygonal hole in said oscillation block for reducing friction.

5. A fishing reel, comprising:

a reel body for attaching to a fishing pole, wherein said reel body has a front end and a rear end;

a main shaft positioned in said reel body and projecting out said front end of said reel body;

a spool positioned around said main shaft forward of said reel body;

a sleeve positioned within said reel body around said main shaft, wherein said sleeve is independently rotatable around said main shaft;

a rotor positioned around said main shaft forward of said reel body and fixedly connected to said sleeve for being driven by said sleeve;

a pinion gear positioned within said reel body fixedly around a rear end of said sleeve and thus fixedly connected to said rotor by said sleeve;

a lead screw positioned within said reel body parallel to said main shaft;

a lead screw gear fixedly attached around a forward end of said lead screw;

a drive gear coaxial with said sleeve and positioned forward of said pinion gear, wherein said drive gear is arranged to rotate simultaneously with said sleeve and said rotor, and said lead screw gear is engaged with and driven by said drive gear; and an oscillation block with a first end slidably connected to said lead screw, and a second end fixedly attached to said rear end of said main shaft;

wherein when said pinion gear is rotated, said rotor is driven to rotate about said main shaft and is adapted to wind a fishing line around said spool, said drive gear is rotated simultaneously with said pinion gear, said lead screw gear is rotated by said drive gear, said lead screw is rotated by said lead screw gear, said oscillation block is repeatedly driven back and forth along said lead screw, said main shaft and said spool are driven back and forth relative to said rotor by being connected to said oscillation block, said spool is thus adapted to spread out said fishing line along a length of said spool for smooth and even filling of said spool in a criss-crossing winding pattern;

wherein said drive gear and said lead screw gear are external of said reel body to enable said drive gear to be enlarged to oscillate said spool faster, to enable easier assembly to reduce cost, and to enable adjusting the oscillation speed of said spool by adjusting the relative sizes of said drive gear and said lead screw gear.

6. The fishing reel of claim 5, wherein said drive gear is larger than said pinion gear for driving said lead screw at greater speed, thereby increasing an oscillation speed of said spool for increasing a crosswind angle between adjacent layers of said fishing line on said spool, wherein the increased crosswind angle prevents succeeding layers of said fishing line from digging into lower layers for smoother casting.

7. The fishing reel of claim 5, wherein said first end of said oscillation block which is slidably connected to said lead screw is offset forwardly relative to said second end which is connected to said main shaft, wherein the forward positioning of said first end of said oscillation block enables said lead screw to be more forward and said reel body to be shorter for compactness.

8. The fishing reel of claim 5, wherein said lead screw is positioned through a polygonal hole in said oscillation block for reducing friction.

9. The fishing reel of claim 5, further including a support pin fixedly attached to said reel body and slidably extending through said oscillation block in parallel to said main shaft, wherein said pin positioned through a polygonal hole in said oscillation block for reducing friction.

10. A fishing reel, comprising:

- a reel body for attaching to a fishing pole, wherein said reel body has a front end and a rear end;
- a main shaft positioned in said reel body and projecting out said front end of said reel body;
- a spool positioned around said main shaft forward of said reel body;
- a sleeve positioned within said reel body around said main shaft, wherein said sleeve is independently rotatable around said main shaft;
- a rotor positioned around said main shaft forward of said reel body and fixedly connected to said sleeve for being driven by said sleeve;
- a pinion gear positioned within said reel body fixedly around a rear end of said sleeve and thus fixedly connected to said rotor by said sleeve;
- a lead screw positioned within said reel body parallel to said main shaft;
- a lead screw gear fixedly attached around a forward end of said lead screw;
- a drive gear coaxial with said sleeve and positioned forward of said pinion gear, wherein said drive gear is arranged to rotate simultaneously with said sleeve and said rotor, and said lead screw gear is engaged with and driven by said drive gear; and
- an oscillation block with a first end slidably connected to said lead screw, and a second end fixedly attached to said rear end of said main shaft;
- wherein when said pinion gear is rotated, said rotor is driven to rotate about said main shaft and is adapted to wind a fishing line around said spool, said drive gear is rotated simultaneously with said pinion gear, said lead screw gear is rotated by said drive gear, said lead screw is rotated by said lead screw gear, said oscillation block is repeatedly driven back and forth along said lead screw, said main shaft and said spool are driven back and forth relative to said rotor by being connected to said oscillation block, said spool is thus adapted to spread out said fishing line along a length of said spool for smooth and even filling of said spool in a criss-crossing winding pattern;
- wherein said drive gear and said lead screw gear are external of said reel body to enable said drive gear to be enlarged to oscillate said spool faster, to enable easier assembly to reduce cost, and to enable adjusting the oscillation speed of said spool by adjusting the relative sizes of said drive gear and said lead screw gear;
- wherein said drive gear is larger than said pinion gear for driving said lead screw at greater speed, thereby increasing an oscillation speed of said spool for increasing a crosswind angle between adjacent layers of said fishing line on said spool, wherein the increased crosswind angle prevents succeeding layers of said fishing line from digging into lower layers for smoother casting;
- wherein said first end of said oscillation block which is slidably connected to said lead screw is offset forwardly relative to said second end which is connected to said main shaft, wherein the forward positioning of said first end of said oscillation block enables said lead screw to be more forward and said reel body to be shorter for compactness.

11. The fishing reel of claim 10, wherein said lead screw is positioned through a polygonal hole in said oscillation block for reducing friction.

12. The fishing reel of claim 10, further including a support pin fixedly attached to said reel body and slidably extending through said oscillation block in parallel to said main shaft, wherein said pin positioned through a polygonal hole in said oscillation block for reducing friction.

* * * * *